United States Patent
Wong et al.

(10) Patent No.: US 8,169,665 B2
(45) Date of Patent: May 1, 2012

(54) TONE DEPENDENT GREEN-NOISE ERROR DIFFUSION METHOD AND PRINTING DEVICE THEREOF

(75) Inventors: Wen-Chian Wong, Hsinchu (TW); Chen-Chung Chen, Taoyuan County (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 610 days.

(21) Appl. No.: 12/414,635

(22) Filed: Mar. 30, 2009

(65) Prior Publication Data

US 2010/0245927 A1    Sep. 30, 2010

(51) Int. Cl.
H04N 1/52 (2006.01)
H04N 1/58 (2006.01)
G06T 5/00 (2006.01)

(52) U.S. Cl. ............ 358/3.04; 358/3.05; 358/3.22; 358/3.26; 358/533; 358/534; 382/237; 382/252; 382/270

(58) Field of Classification Search .......... 358/1.9, 358/3.03–3.06, 3.21–3.23, 534–536, 465–466; 382/251, 252, 237, 270
See application file for complete search history.

(56) References Cited

U.S. PATENT DOCUMENTS

| 5,940,541 | A * | 8/1999 | Donelly ................ 382/252 |
| 5,973,803 | A * | 10/1999 | Cheung et al. ............ 358/534 |
| 6,501,564 | B1 * | 12/2002 | Schramm et al. .......... 358/1.9 |
| 6,563,957 | B1 * | 5/2003 | Li et al. ................ 382/252 |
| 6,798,537 | B1 * | 9/2004 | Lau et al. .............. 358/1.9 |
| 7,298,525 | B2 * | 11/2007 | Hagai et al. ............ 358/1.9 |
| 7,319,549 | B2 * | 1/2008 | Thakur ................ 358/3.03 |
| 2009/0251736 | A1 * | 10/2009 | Kawamura ............ 358/3.03 |
| 2009/0310161 | A1 * | 12/2009 | Kawamura .............. 358/1.9 |
| 2010/0091331 | A1 * | 4/2010 | Kawamura ............ 358/3.01 |

* cited by examiner

*Primary Examiner* — Scott A Rogers
(74) *Attorney, Agent, or Firm* — Kile Goekjian Reed & McManus PLLC

(57) ABSTRACT

A tone dependent green-noise error diffusion method includes setting a first threshold and a second threshold, and determining a two-level value of a color level of an input image according to the first threshold and the second threshold; subtracting the two-level value from the color level value to generate an error value; performing an error diffusion on the error value to generate an error diffusion accumulation value; adjusting the color level according to the error diffusion accumulation value; performing a hysteresis filtering on the two-level value to generate an output dependent feedback value; and adjusting the color level according to the output dependent feedback value.

14 Claims, 9 Drawing Sheets

| (x−1, y−1) 255 | (x, y−1) 0 | (x+1, y−1) 0 |
|---|---|---|
| (x−1, y) 255 | (x, y) 155 | (x+1, y) 150 |
| (x−1, y+1) 150 | (x, y+1) 150 | (x+1, y+1) 150 |

(1A)

Output feedback weighting value

| 0 | 1.2 | 0 |
|---|---|---|
| 0.8 | * | 0 |

(1B)

Output feedback value

| 0 | 0 | 0 |
|---|---|---|
| 204 | * | 0 |

(1C)

| (x−1, y−1) 255 | (x, y−1) 0 | (x+1, y−1) 0 |
|---|---|---|
| (x−1, y) 255 | (x, y) 359 | (x+1, y) 150 |
| (x−1, y+1) 150 | (x, y+1) 150 | (x+1, y+1) 150 |

| (x-1, y-1) 255 | (x, y-1) 0 | (x+1, y-1) 0 |
|---|---|---|
| (x-1, y) 255 | (x, y) 255 | (x+1, y) 150 |
| (x-1, y+1) 150 | (x, y+1) 150 | (x+1, y+1) 150 |

(2B) Error diffusion weighting value

| 0 | * | 0.5 |
|---|---|---|
| 0 | 0.5 | 0 |

(2C) Error diffusion value

| 0 | * | -50 |
|---|---|---|
| 0 | -50 | 0 |

(2D)

| (x-1, y-1) 255 | (x, y-1) 0 | (x+1, y-1) 0 |
|---|---|---|
| (x-1, y) 255 | (x, y) 255 | (x+1, y) 100 |
| (x-1, y+1) 150 | (x, y+1) 100 | (x+1, y+1) 150 |

FIG. 2 PRIOR ART

TONE DEPENDENT GREEN-NOISE ERROR DIFFUSION METHOD AND PRINTING DEVICE THEREOF

BACKGROUND OF THE INVENTION

1. Field of the Invention

The present invention relates to a half-tone image processing technique, and more particularly, to a tone dependent green-noise error diffusion method capable of enhancing printing quality and printing apparatus thereof.

2. Description of the Prior Art

Half-tone image processing technique is extensively applied to printing apparatuses. Half-tone image processing technique transfers a continuous-tone image into a two-level half-tone image, and a printing apparatus selectively performs a printing operation according to pixels of the two-level image, thereby generating a printed result close to a continuous-tone image. Frequency modulation half-tone image processing method, e.g., an error diffusion method, is frequently used on inkjet printers. However, a laser printer that employs this method will suffer color shift. To prevent this color shift problem, laser printers usually employ an amplitude modulation half-tone image processing method. Nevertheless, the printer employing this method usually suffers from a moire pattern when performing a copying operation.

The green-noise error diffusion method, which acquires a characteristic between the frequency modulation half-tone image processing method and the amplitude modulation half-tone image processing method, is capable of solving the phenomenon of color shift for laser printers as well as the moire pattern generated when performing copying operations. Please refer to FIG. 1 and FIG. 2. FIG. 1 and FIG. 2 are diagrams of an operation of a conventional green-noise error diffusion method. FIG. 1 (including sub-diagrams FIG. 1A, FIG. 1B, FIG. 1C and FIG. 1D) indicates pixel color level values modified by an output feedback apparatus, and FIG. 2 (including sub-diagrams FIG. 2A, FIG. 2B, FIG. 2C and FIG. 2D) indicates pixel color level values diffused by an error diffusion apparatus. As shown in FIG. 1A, (x, y) indicates a pixel which is currently being processed, wherein the color level value thereof is 155; (x−1, y−1), (x, y−1), (x+1, y−1), (x−1, y) are pixels which are already processed; and (x+1, y), (x−1, y+1), (x, y+1), (x+1, y+1) are pixels which are not processed yet. FIG. 1B is a diagram of a distribution of output feedback weighting values: the mark * indicates the pixel (x, y) which is currently processed, the value 0.8 indicates a second output feedback weighting value of the pixel (x, y), and the value 1.2 indicates a first output feedback weighting value of the pixel (x, y). FIG. 1C indicates output feedback values of neighboring pixels (x−1, y) and (x, y−1) of the pixel (x, y) in FIG. 1A that are derived according to the output feedback weighting values in FIG. 1B. FIG. 1D indicates a modified color level value derived from the pixel (x, y) in FIG. 1A plus the output feedback values in FIG. 1C.

Please refer to FIG. 2. Since the modified color level value 359 of the pixel (x, y) in FIG. 1D is larger than a threshold 127, a two-level value of the pixel (x, y) is set as 255, as shown in FIG. 2A. FIG. 2B is a diagram of a distribution of error diffusion weighting values, where the mark * indicates the pixel (x, y) which is currently processed, and the two values 0.5 and 0.5 indicate a first error diffusion weighting value and a second error diffusion weighting value of the pixel (x, y), respectively. The error value between the color level value 155 of the pixel (x, y) in FIG. 1A and the two-level value 255 of the pixel (x, y) in FIG. 2A is (−100). FIG. 2C indicates error diffusion values derived from a calculation of the error value (−100) according to the error diffusion weighting values in FIG. 2B. Finally, the error diffusion values in FIG. 2C are diffused to neighboring pixels (x+1, y) and (x, y+1) of the pixel (x, y) in FIG. 2A to thereby derive diffused pixel color level values as shown in FIG. 2D. The respective flows in FIG. 1 and FIG. 2 are repeated until all the pixels are processed.

The green-noise error diffusion method still suffers from image defects of a regular pattern in bright color level, middle color level and dark color level; therefore, there still remains room for improvement of this prior art method.

SUMMARY OF THE INVENTION

One of the objectives of the present invention is to provide a tone dependent green-noise error diffusion method and a printing apparatus thereof to solve the problems encountered in the prior art.

The present invention provides a tone dependent green-noise error diffusion method for processing a continuous-tone input image arranged as a two-dimensional matrix. A location of a specific pixel of the continuous-tone image is presented by (x, y), where the specific pixel may comprise a plurality of colors. The method comprises the following steps: generating a first output feedback weighting value and a second output feedback weighting value according to a color level value of a first color of the specific pixel; executing an output feedback operation to generate a modified color level value according to the first output feedback weighting value and the second output feedback weighting value of the specific pixel; generating a first threshold value and a second threshold value of the first color according to the color level value of the first color; determining an output two-level value of the first color according to the modified color level value of the first color, the first threshold value and the second threshold value; generating a first error diffusion weighting value and a second error diffusion weighting value of the first color according to the color level value of the first color of the specific pixel; and executing an error diffusion operation according to the output two-level value of the first color, the first error diffusion weighting value and the second error diffusion weighting value.

The present invention also provides a printing apparatus for processing a continuous-tone input image arranged as a two-dimensional matrix. A location of a specific pixel of the continuous-tone image is presented by (x, y), where the specific pixel may comprise a plurality of colors. The printing apparatus includes a first adder, a second adder, a threshold comparing apparatus, a subtracter, an error diffusion apparatus, and an output feedback apparatus. The first adder has a first terminal and a second terminal, wherein the first terminal receives a color level value of a first color of the specific pixel and the second terminal receives an error diffusion value of the first color of the specific pixel to generate a first modified color level value of the first color of the specific pixel. The second adder has a first terminal and a second terminal, wherein the first terminal receives the first modified color level value of the first color and the second terminal receives a output feedback value which is fed back to the first color of the specific pixel, thereby generating a second modified color level value of the second color of the specific pixel. The threshold comparing apparatus has a first terminal and a second terminal, wherein the first terminal receives the color level value of the first color of the specific pixel to generate a first threshold value and a second threshold value, the second terminal receives the second modified color level value of the first color, and the threshold comparing apparatus compares the second modified color level value with the first and the second threshold value of the first color to generate a two-level value of the first color of the specific pixel. The subtracter has a first terminal and a second terminal, wherein the first terminal receives the first modified color level value of the first color of the specific pixel and the second terminal receives the two-level value of the first color of the specific pixel, thereby generating an error value of the first color of the specific pixel. The error diffusion apparatus has a first terminal and a second terminal, wherein the first terminal receives the color level value of the first color of the specific pixel to generate a first error diffusion weighting value and a second error diffusion weighting value, and the second terminal receives the error value of the first color of the specific pixel to generate an error diffusion value of the first color of the specific pixel. The output feedback apparatus has a first terminal and a second terminal, wherein the first terminal receives the color level value of the first color of the specific pixel to generate a first output feedback weighting value and a second output feedback weighting value, and the second terminal receives the two-level value of the first color of the specific pixel to generate an output feedback value of the first color of the specific pixel. The printing apparatus could be a laser printer or a multi-function printer.

The green-noise error diffusion method and the related printing apparatus according to the present invention modify the prior art techniques to solve the defects of the regular pattern in bright color level, middle color level and dark color level, thereby greatly improving the quality of image printing.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 (including sub-diagrams FIG. 1A, FIG. 1B, FIG. 1C and FIG. 1D) is a diagram of an operation of a conventional green-noise error diffusion method.

FIG. 2 (including sub-diagrams FIG. 2A, FIG. 2B, FIG. 2C and FIG. 2D) is a diagram of an operation of a conventional green-noise error diffusion method.

DETAILED DESCRIPTION

Figure 3:
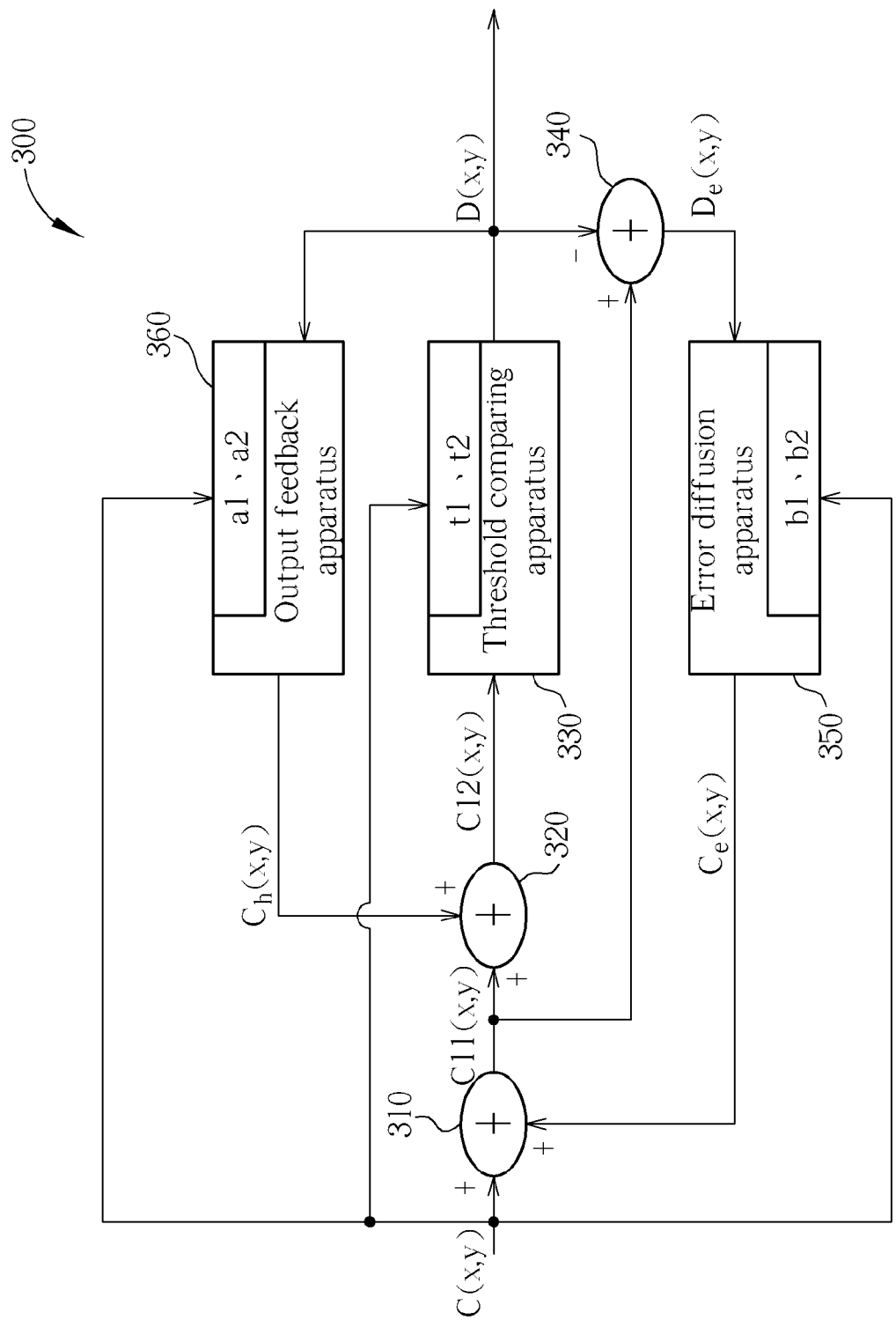
FIG. 3 is a diagram of a printing apparatus for processing an input image according to an embodiment of the present invention.

Please refer to FIG. 3. FIG. 3 is a diagram of a printing apparatus for processing an input image according to an embodiment of the present invention. The continuous-tone image is arranged as a two-dimensional matrix, a location of a specific pixel of the continuous-tone image is presented by (x, y), and the specific pixel comprises three colors, e.g., cyan, magenta and yellow, whose color level values are represented by $C(x, y)$, $M(x, y)$, $Y(x, y)$, respectively. In this embodiment, cyan $C(x, y)$ is used as an exemplary example for illustrating features of the present invention, but this embodiment also applies to the magenta and yellow colors. As shown in FIG. 3, a printing apparatus 300 includes (but is not limited to) a first adder 310, a second adder 320, a threshold comparing apparatus 330, a subtracter 340, an error diffusion apparatus 350 and an output feedback apparatus 360.

The first adder 310 comprises a first terminal and a second terminal, and the first terminal receives a color level value $C(x, y)$ of cyan of the specific pixel and the second terminal receives an error diffusion value $C_e(x, y)$ of cyan of the specific pixel to generate a first modified color level value $C11(x, y)$ of cyan of the specific pixel. The second adder 320 comprises a first terminal and a second terminal, and the first terminal receives the modified color level value $C11(x, y)$ of cyan and the second terminal receives a output feedback value $C_h(x, y)$ which is fed back to the specific pixel, thereby generating a second modified color level value $C12(x, y)$ of the second color of the specific pixel.

Figure 4A:
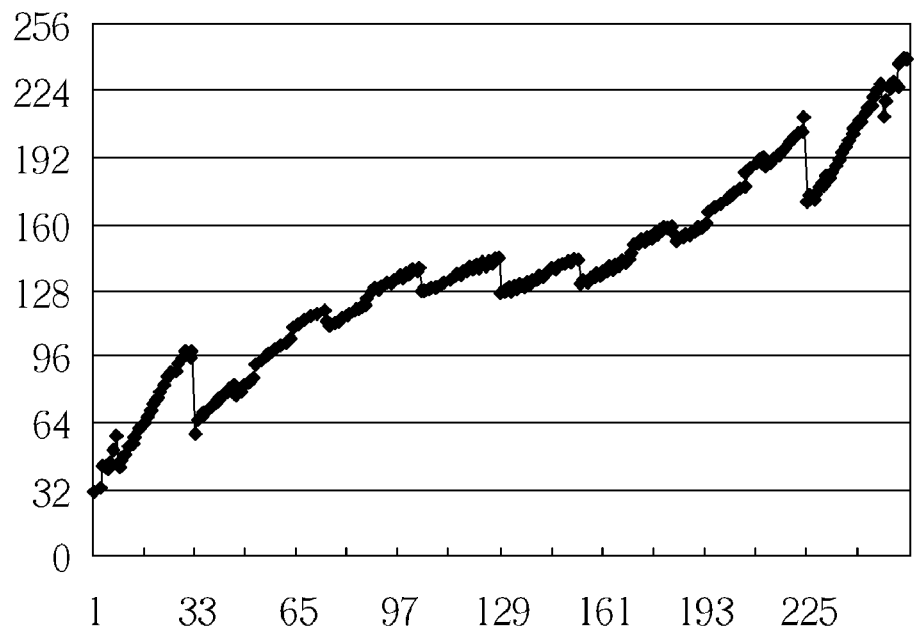
FIG. 4A is a line chart of the values of the threshold comparing apparatus in FIG. 3.
Figure 4A:
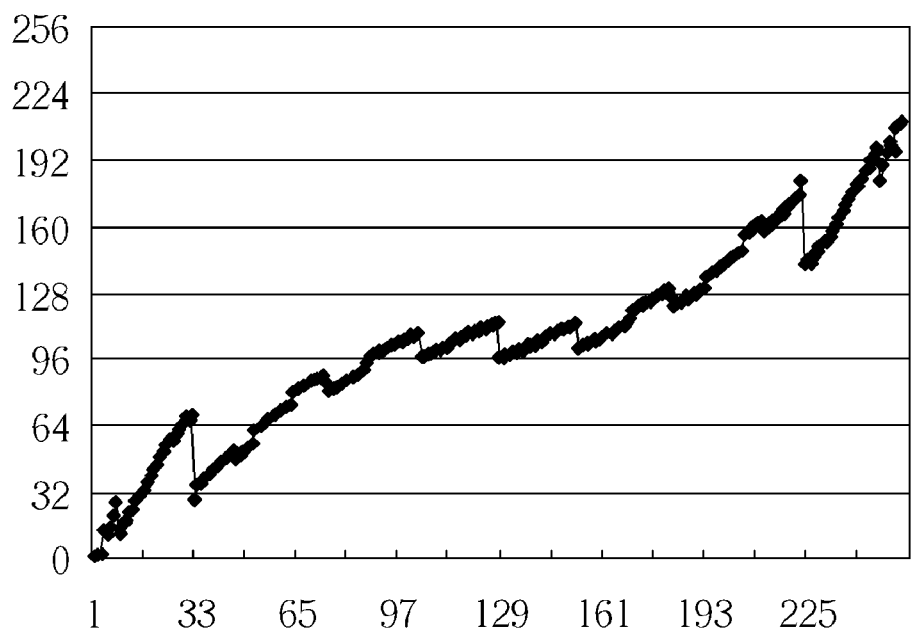

The threshold comparing apparatus 330 comprises a first terminal and a second terminal, and the first terminal receives the color level value $C(x, y)$ of cyan of the specific pixel to generate a first threshold value t1 and a second threshold value t2. Please refer to FIG. 4A in conjunction with FIG. 3. FIG. 4A is a line chart of the threshold values t1 and t2 of the threshold comparing apparatus 330 in FIG. 3. A corresponding threshold value can be derived according to the color level value $C(x, y)$ of cyan. The second terminal of the threshold comparing apparatus 330 receives the second modified color level value $C12(x, y)$ of cyan, and then the threshold comparing apparatus 330 compares the second modified color level value $C12(x, y)$ with the first threshold value t1 and the second threshold value t2 of cyan to generate an output two-level value $D(x, y)$ of cyan of the specific pixel.

The subtracter 340 comprises a first terminal and a second terminal, and the first terminal receives the first modified color level value $C11(x, y)$ of cyan of the specific pixel and the second terminal receives the two-level value $D(x, y)$ of cyan of the specific pixel, thereby generating an error value $D_e(x, y)$ of cyan of the specific pixel.

Figure 4B:
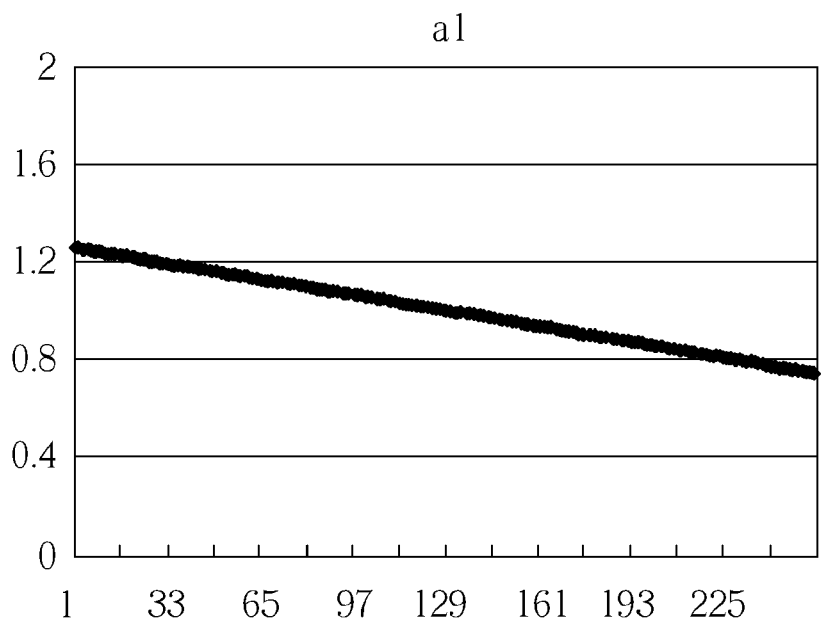
FIG. 4B is a line chart of the values of the error diffusion apparatus in FIG. 3.
Figure 4B:
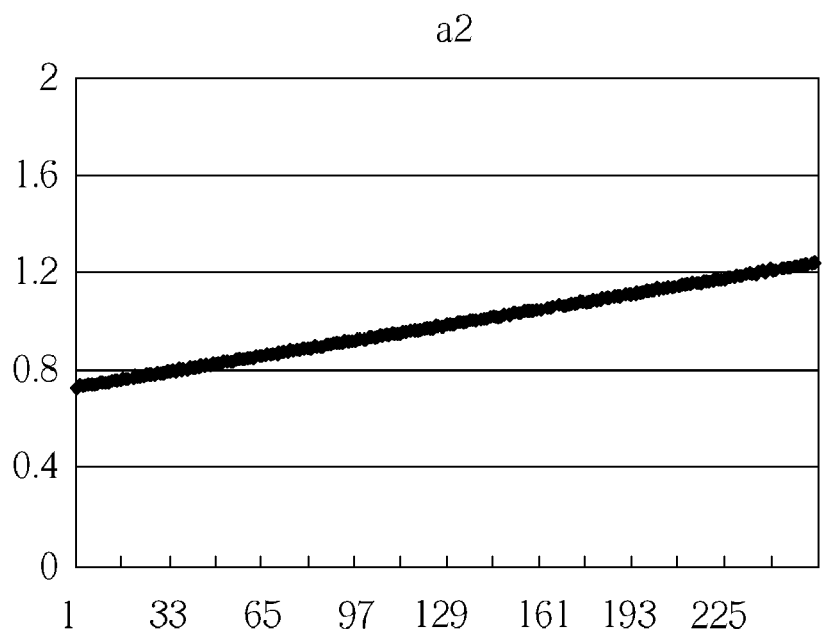
Figure 5:
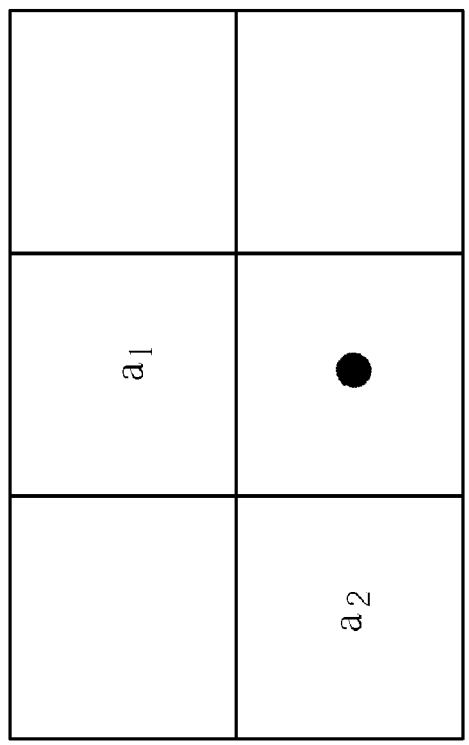
FIG. 5 (including sub-diagrams FIG. 5A and FIG. 5B) is a diagram of a distribution of the weighting values of the error diffusion apparatus and the output feedback apparatus shown in FIG. 3.
Figure 5:
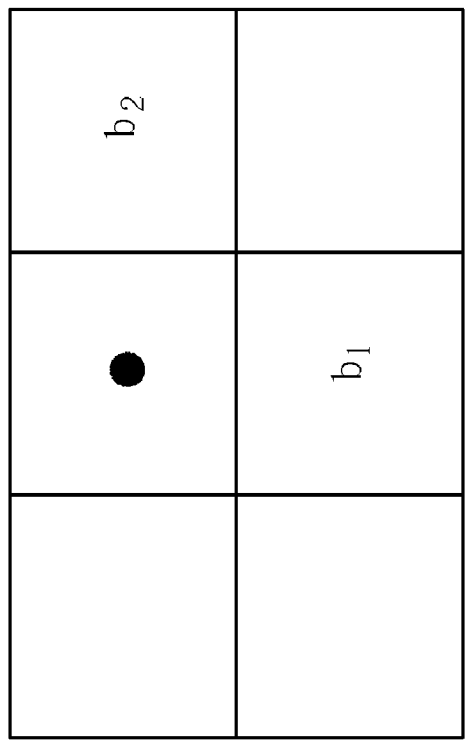

The error diffusion apparatus 350 comprises a first terminal and a second terminal, and the first terminal receives the color level value $C(x, y)$ of cyan of the specific pixel to generate a first error diffusion weighting value b1 and a second error diffusion weighting value b2. Please refer to FIG. 4B in conjunction with FIG. 5, wherein FIG. 4B is a line chart of the values of the error diffusion apparatus 350 in FIG. 3, and FIG. 5 (including sub-diagrams FIG. 5A and FIG. 5B) is a diagram of a distribution of the weighting values of the error diffusion apparatus 350 and the output feedback apparatus 360 shown in FIG. 3. As shown in FIG. 4B, a line chart of an error diffusion weighting values of b1 and b2 shows that a corresponding error diffusion weighting value can be derived according to the color level value $C(x, y)$ of cyan. FIG. 5A is a diagram of a distribution of weighting values b1 and b2. The second terminal of the error diffusion apparatus 350 receives the error value $D_e(x, y)$ of cyan of the specific pixel, and then the error diffusion apparatus 350 generates an error diffusion value $C_e(x, y)$ of cyan of the specific pixel.

Figure 4C:
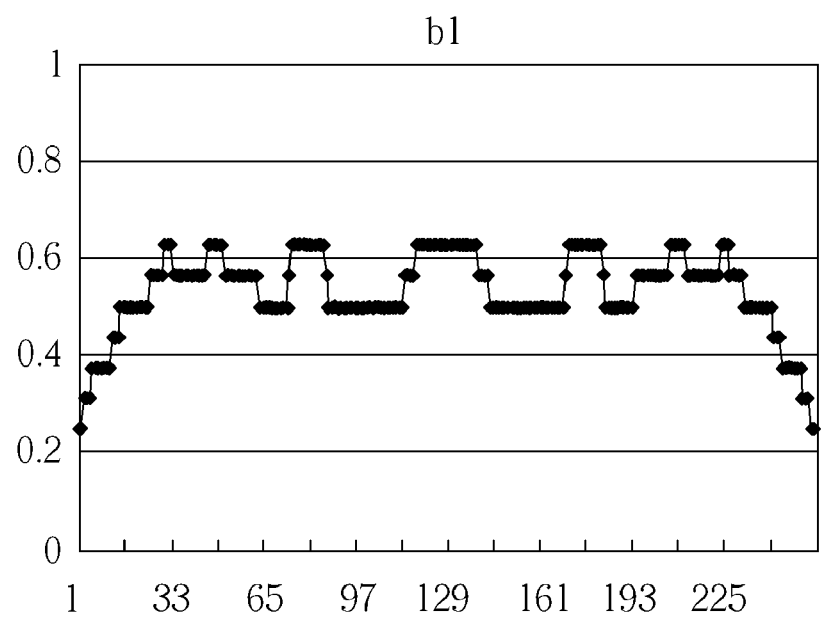
FIG. 4C is a line chart of the values of the output feedback apparatus in FIG. 3.
Figure 4C:
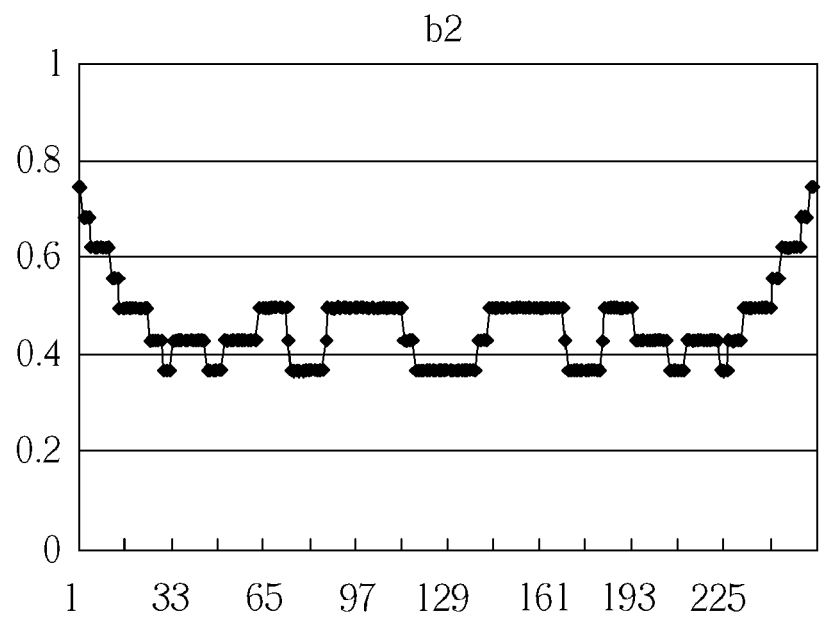

The output feedback apparatus 360 comprises a first terminal and a second terminal, and the first terminal receives the color level value $C(x, y)$ of cyan of the specific pixel to generate a first output feedback weighting value a1 and a second output feedback weighting value a2. FIG. 4C is a line chart of a distribution of the output feedback weighting values a1 and a2. A corresponding output feedback weighting value therefore can be derived according to the color level value C(x, y) of cyan. FIG. 5B is a diagram of a distribution of the weighting values a1 and a2. The second terminal of the output feedback apparatus 360 receives the two-level value D(x, y) of cyan of the specific pixel, and then the output feedback apparatus 360 generates an output feedback value $C_h(x, y)$ of cyan of the specific pixel.

Please note that the aforementioned printing apparatus 300 could be a laser printer or a multi-function printer, but this is not meant to be a limitation to the scope of the present invention.

Figure 6:
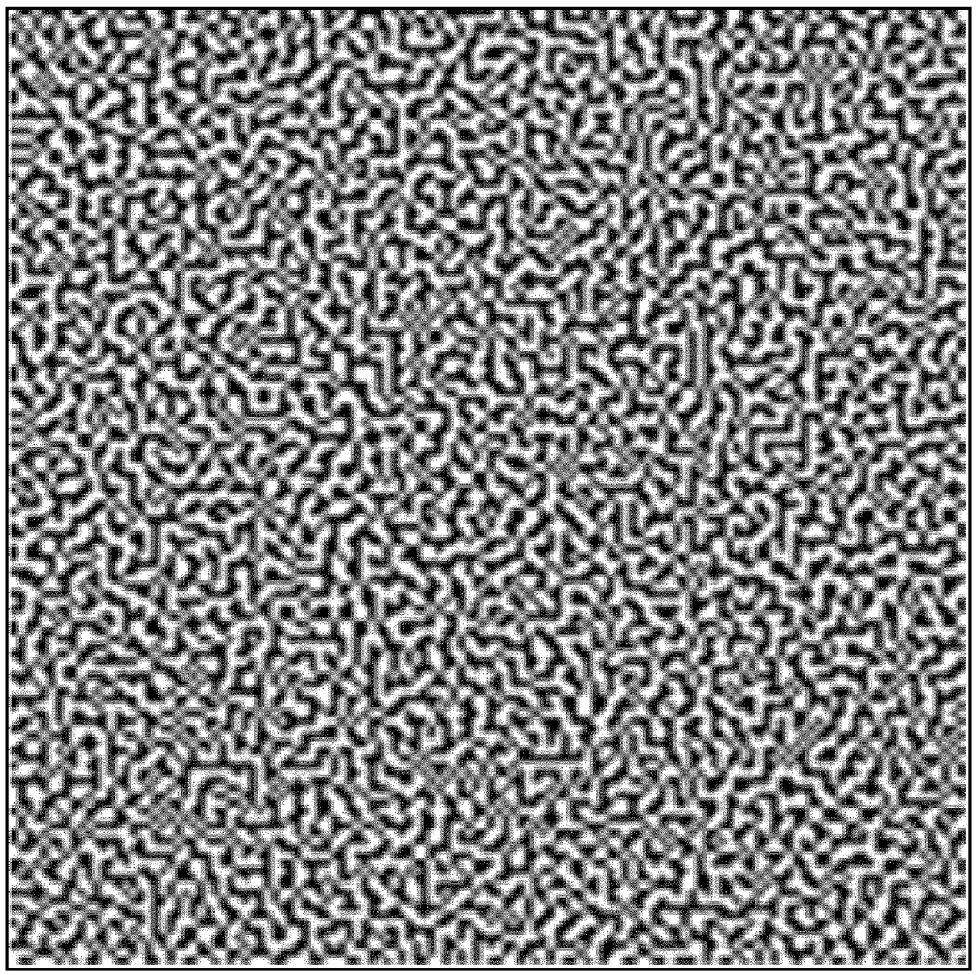
FIG. 6 is a diagram of a two-level image according to the present invention.

Please be aware that the aforementioned first threshold value t1 is larger than or equal to the second threshold value t2. A first value D1 is output to serve as the output two-level value D(x, y) of cyan of the specific pixel when the second modified color level value C12(x, y) of cyan of the specific pixel is larger than the first threshold value t1, a first value D1 is output to serve as the output two-level value D(x, y) of cyan of the specific pixel when the second modified color level value C12(x, y) of cyan of the specific pixel is smaller than the second threshold value t2, and the output two-level value D(x, y) of cyan of the specific pixel is determined according to a two-level image (as shown in FIG. 6 which is a diagram of a two-level image) when the second modified color level value C12(x, y) of cyan of the specific pixel is between the first threshold value t1 and the second threshold value t2.

The aforementioned first value D1 could be set as 255, and the second value D2 could be set as 0, but this is not meant to be a limitation to the scope of the present invention.

Please note that the aforementioned parameters, including a1, a2, b1, b2, t1, t2, could be set by fixed values for follow-up operations.

Figure 7:
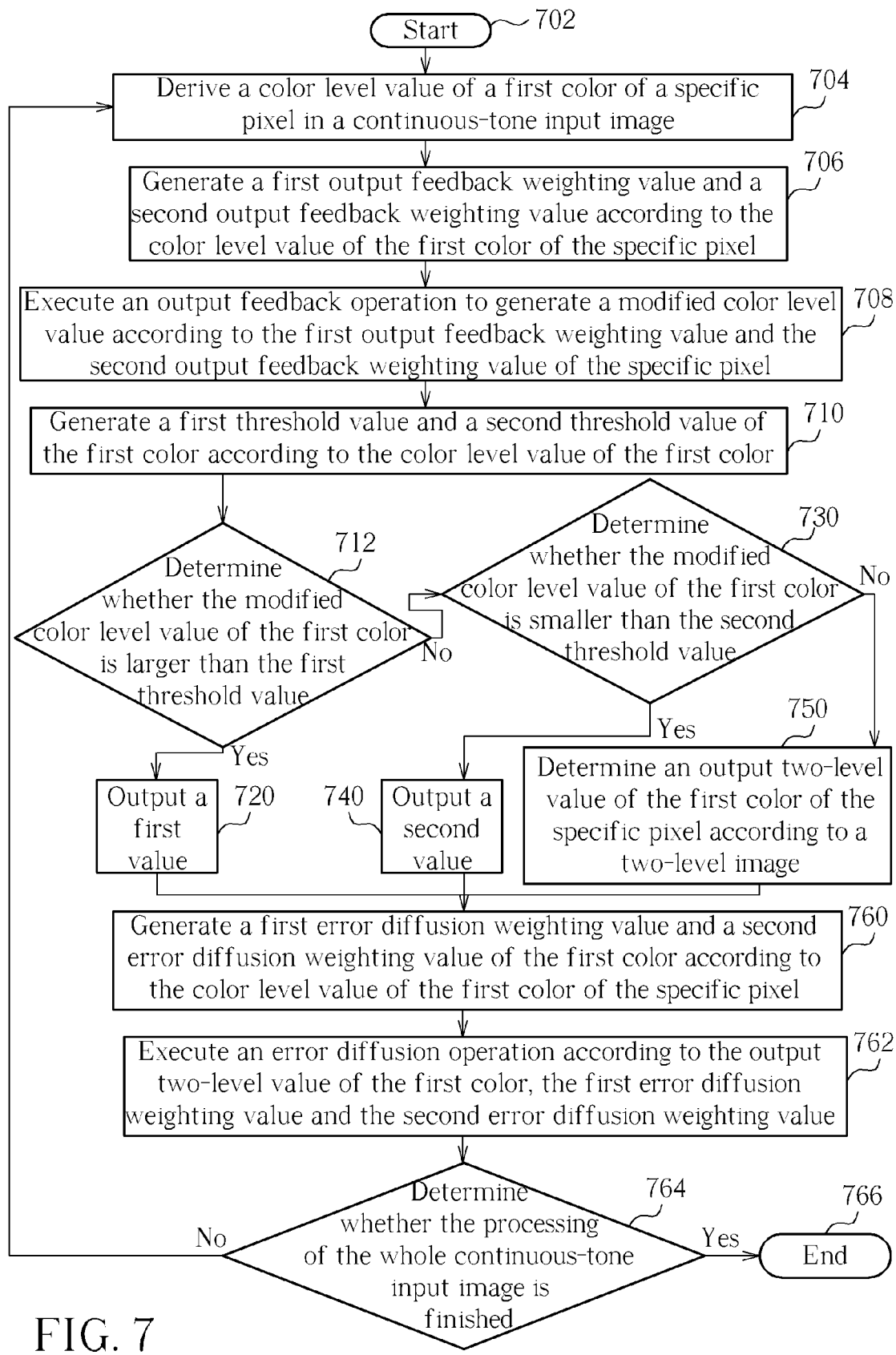
FIG. 7 is a flowchart of an operational example of a tone dependent green noise error diffusion method according to the present invention.

Please refer to FIG. 7. FIG. 7 is a flowchart of an operational example of a tone dependent green noise error diffusion method according to the present invention. Please note that if substantially the same result can be derived, the following steps are not required to be executed in the exact order shown in FIG. 7. The exemplary flow includes the following steps:

Step 702: Start.

Step 704: Derive a color level value of a first color of a specific pixel in a continuous-tone input image.

Step 706: Generate a first output feedback weighting value and a second output feedback weighting value according to the color level value of the first color of the specific pixel.

Step 708: Execute an output feedback operation to generate a modified color level value according to the first output feedback weighting value and the second output feedback weighting value of the specific pixel.

Step 710: Generate a first threshold value and a second threshold value of the first color according to the color level value of the first color.

Step 712: Determine whether the modified color level value of the first color is larger than the first threshold value: if yes, go to step 720; otherwise, go to step 730.

Step 720: Output a first value, and proceed to step 760.

Step 730: Determine whether the modified color level value of the first color is smaller than the second threshold value: if yes, go to step 740; otherwise, go to step 750.

Step 740: Output a second value and proceed to step 760.

Step 750: Determine an output two-level value of the first color of the specific pixel according to a two-level image, then proceed to step 760.

Step 760: Generate a first error diffusion weighting value and a second error diffusion weighting value of the first color according to the color level value of the first color of the specific pixel.

Step 762: Execute an error diffusion operation according to the output two-level value of the first color, the first error diffusion weighting value and the second error diffusion weighting value.

Step 764: Determine whether the processing of the whole continuous-tone input image is finished: if yes, go to step 766; otherwise, go back to step 704.

Step 766: End.

Please refer to the steps in FIG. 7 in conjunction with the elements in FIG. 3 to obtain a detailed comprehension of interactions among each element. Further operation of steps in FIG. 7 is omitted for succinctness. It should be noted that the aforementioned steps are only one applicable embodiment of the present invention, and are not meant to be a limitation to the scope of the present invention. Other steps can be inserted in between, or several steps can be combined into a single step without departing from the spirit of the present invention.

The aforementioned embodiments are for illustrations of characteristics of the present invention, rather than limitations to the present invention. The green-noise error diffusion method and the printing apparatus thereof disclosed in this invention modify the prior art techniques to solve the defects of the regular pattern in bright color level, middle color level and dark color level, thereby greatly improving the quality of image printing.

Those skilled in the art will readily observe that numerous modifications and alterations of the device and method may be made while retaining the teachings of the invention.

What is claimed is:

1. A tone dependent green-noise error diffusion method, for processing a continuous-tone input image arranged as a two-dimensional matrix, a location of a specific pixel of the continuous-tone image being represented by (x, y), the specific pixel comprising a plurality of colors, the method comprising:

generating a first output feedback weighting value and a second output feedback weighting value according to a color level value of a first color of the specific pixel;

executing an output feedback operation to generate a modified color level value according to the first output feedback weighting value and the second output feedback weighting value of the specific pixel;

generating a first threshold value and a second threshold value of the first color according to the color level value of the first color;

determining an output two-level value of the first color according to the modified color level value of the first color, the first threshold value and the second threshold value;

generating a first error diffusion weighting value and a second error diffusion weighting value of the first color according to the color level value of the first color of the specific pixel; and executing an error diffusion operation according to the output two-level value of the first color, the first error diffusion weighting value and the second error diffusion weighting value.

2. The method of claim 1, wherein the step of executing the output feedback operation to generate the modified color level value comprises:

generating an output feedback value of the first color of the specific pixel according to a color level value of the first color of at least one neighboring pixel of the specific pixel, the first output feedback weighting value and the second output feedback value of the first color of the specific pixel; and adding the output feedback value of the first color to the color level value of the first color of the specific pixel to generate the modified color level value of the first color.

3. The method of claim 1, wherein the at least one neighboring pixel of the specific pixel includes pixels at locations of (x−1, y) and (x, y−1) of the two-dimensional matrix.

4. The method of claim 1, wherein the first threshold value of the first color of the specific pixel is larger than or equal to the second threshold value, and the step of determining the output two-level value of the first color comprises:

outputting a first value to serve as the output two-level value of the first color of the specific pixel when the modified color level value of the first color of the specific pixel is larger than the first threshold value;

outputting a second value to serve as the output two-level value of the first color of the specific pixel when the modified color level value of the first color of the specific pixel is smaller than the second threshold value; and determining the output two-level value of the first color of the specific pixel according to a two-level image when the modified color level value of the first color of the specific pixel is between the first threshold value and the second threshold value.

5. The method of claim 4, wherein the first value is 255.

6. The method of claim 4, wherein the second value is 0.

7. The method of claim 1, wherein the step of executing the error diffusion operation comprises:

subtracting the output two-level value of the first color from the color level value of the first color to generate an error value of the first color; and diffusing the error value to the first color of at least one neighboring pixel of the specific pixel according to the first error weighting value and the second error weighting value of the first color of the specific pixel.

8. The method of claim 7, wherein the at least one neighboring pixel of the specific pixel includes pixels at locations of (x+1, y) and (x, y+1) of the two-dimensional matrix.

9. The method of claim 2, wherein the plurality of colors comprises cyan, magenta and yellow.

10. A printing apparatus for processing a continuous-tone input image arranged as a two-dimensional matrix, a location of a specific pixel of the continuous-tone image being represented by (x, y), the specific pixel comprising a plurality of colors, the printing apparatus comprising:

a first adder, comprising a first terminal and a second terminal, wherein the first terminal of the first adder receives a color level value of a first color of the specific pixel and the second terminal of the first adder receives an error diffusion value of the first color of the specific pixel, thereby generating a first modified color level value of the first color of the specific pixel;

a second adder, comprising a first terminal and a second terminal, wherein the first terminal of the second adder receives the first modified color level value of the first color and the second terminal of the second adder receives a output feedback value which is fed back to the first color of the specific pixel, thereby generating a second modified color level value of the second color of the specific pixel;

a threshold comparing apparatus, comprising a first terminal and a second terminal, wherein the first terminal of the threshold comparing apparatus receives the color level value of the first color of the specific pixel to generate a first threshold value and a second threshold value, the second terminal of the threshold comparing apparatus receives the second modified color level value of the first color, and the threshold comparing apparatus compares the second modified color level value with the first threshold value and the second threshold value of the first color to generate a two-level value of the first color of the specific pixel;

a subtracter, comprising a first terminal and a second terminal, wherein the first terminal of the subtracter receives the first modified color level value of the first color of the specific pixel and the second terminal of the subtracter receives the two-level value of the first color of the specific pixel, thereby generating an error value of the first color of the specific pixel;

an error diffusion apparatus, comprising a first terminal and a second terminal, wherein the first terminal of the error diffusion apparatus receives the color level value of the first color of the specific pixel to generate a first error diffusion weighting value and a second error diffusion weighting value, and the second terminal of the error diffusion apparatus receives the error value of the first color of the specific pixel to generate an error diffusion value of the first color of the specific pixel; and an output feedback apparatus, comprising a first terminal and a second terminal, wherein the first terminal of the output feedback apparatus receives the color level value of the first color of the specific pixel to generate a first output feedback weighting value and a second output feedback weighting value, and the second terminal of the output feedback apparatus receives the two-level value of the first color of the specific pixel to generate an output feedback value of the first color of the specific pixel.

11. The printing apparatus of claim 10, wherein the first threshold value of the first color of the specific pixel is larger than or equal to the second threshold value, and the threshold comparing apparatus is utilized for:

outputting a first value to serve as the output two-level value of the first color of the specific pixel when the second modified color level value of the first color of the specific pixel is larger than the first threshold value;

outputting a second value to serve as the output two-level value of the first color of the specific pixel when the second modified color level value of the first color of the specific pixel is smaller than the second threshold value; and determining the output two-level value of the first color of the specific pixel according to a two-level image when the second modified color level value of the first color of the specific pixel is between the first threshold value and the second threshold value.

12. The printing apparatus of claim 11, wherein the first value is 255.

13. The printing apparatus of claim 11, wherein the second value is 0.

14. The printing apparatus of claim 11, being a laser printer or a multi-function printer.

* * * * *